United States Patent [19]

Thompson et al.

[11] 4,235,714
[45] Nov. 25, 1980

[54] HYDROPHILIC POLYAMIDE FILM FOR SEMIPERMEABLE MEMBRANES

[75] Inventors: Robert M. Thompson, Wilmington, Del.; David C. White, Concordville, Pa.

[73] Assignee: Suntech, Inc., Philadelphia, Pa.

[21] Appl. No.: 970,409

[22] Filed: Dec. 18, 1978

[51] Int. Cl.³ .................... B31D 13/00; C02F 1/44; C08L 77/00
[52] U.S. Cl. ................ 210/654; 210/433 M; 210/321 R; 525/432
[58] Field of Search .......... 260/857 TW; 210/321 R; 525/432

[56] References Cited

U.S. PATENT DOCUMENTS

| | | | |
|---|---|---|---|
| 2,339,237 | 1/1944 | Brubaker | 260/78 R |
| 2,577,621 | 12/1951 | May | 260/78 R |
| 3,397,107 | 8/1968 | Kimura | 161/173 |
| 3,499,353 | 3/1970 | Griebsch | 260/13 |
| 3,509,106 | 4/1970 | Lotz | 260/78 R |
| 3,549,724 | 12/1970 | Okazaki | 260/857 |
| 3,683,047 | 8/1972 | Honda | 260/857 TW |
| 3,729,449 | 4/1973 | Kimura | 260/78 R |
| 3,863,609 | 10/1974 | Kimura | 260/78 R |
| 3,882,090 | 5/1975 | Fagerburg | 260/78 R |
| 4,044,071 | 8/1977 | Nickol | 260/857 TW |
| 4,045,511 | 8/1977 | Nickol | 260/857 TW |
| 4,045,512 | 8/1977 | Thompson et al. | 260/857 TW |
| 4,113,794 | 9/1978 | Thompson et al. | 260/857 TW |
| 4,130,602 | 12/1978 | Thompson | 525/432 |
| 4,136,133 | 1/1979 | Thompson | 525/432 |
| 4,165,346 | 8/1979 | Thompson | 525/432 |
| 4,177,222 | 12/1979 | Thompson | 525/432 |

FOREIGN PATENT DOCUMENTS

| | | |
|---|---|---|
| 822165 | 5/1975 | Belgium . |
| 2454119 | 5/1975 | Fed. Rep. of Germany ... 260/857 TW |
| 2454142 | 5/1975 | Fed. Rep. of Germany ... 260/857 TW |
| 562370 | 2/1946 | United Kingdom . |
| 574713 | 1/1946 | United Kingdom . |
| 615954 | 1/1949 | United Kingdom . |
| 1030344 | 5/1966 | United Kingdom . |
| 1304865 | 1/1973 | United Kingdom . |

*Primary Examiner*—Paul Lieberman
*Attorney, Agent, or Firm*—J. Edward Hess; Donald R. Johnson; Anthony Potts, Jr.

[57] ABSTRACT

Semipermeable membranes useful in membrane separation processes are formed from a hydrophilic polyamide which is a block copolymer of nylon and a poly(dioxaamide) such as poly(4,7-dioxadecamethylene adipamide).

5 Claims, No Drawings

HYDROPHILIC POLYAMIDE FILM FOR SEMIPERMEABLE MEMBRANES

CROSS REFERENCE TO RELATED APPLICATIONS

This application is related to the application of Robert M. Thompson, Ser. No. 769,246, filed Feb. 16, 1977 now U.S. Pat. No. 4,130,602, the disclosure of which is incorporated herein by reference. Said application 769,246 was in turn a continuation in part of application Ser. No., 557,717 of Robert M. Thompson, filed Mar. 12, 1975, now abandoned, which was in turn a continuation in part of application Ser. No. 418,524 of Robert M. Thompson, filed Nov. 14, 1973, now abandoned.

BACKGROUND OF THE INVENTION

Numerous membrane separation processes are known wherein a material having different permeabilities to two materials is used to separate and/or concentrate a mixture of the materials. Some of these processes include diffusion control, gas separation, dialysis, ultrafiltration, osmosis, reverse osmosis, pervaporation, diasolysis, hemodialysis, piezodialysis and forced flow electrophoresis. These processes are well known and a good description is in Encyclopedia of Polymer Science and Technology Vol. 8, page 620, 1968. They all use a semipermeable membrane as the basic separation device although incorporating other features such as pressure, electrical assistance, etc., to speed or otherwise affect the separation. Membranes in these processes must not only have the desired morphology to achieve the appropriate separation but must process easily, have good mechanical properties and be stable in their environments.

SUMMARY OF THE INVENTION

The present invention relates to the use of a specific polymer as the semipermeable membrane in membrane separation processes such as those described above. The polymer is as described in U.S. Pat. No. 4,130,602 and is a block copolymer of a nylon and a poly(dioxa-amide). The copolymer is hydrophilic because of the introduction of the ether linkages but much improvement in properties is obtained by the block copolymer characteristic as opposed to the ether-containing random copolymers of the prior art. The copolymers employed in the present invention have several outstanding properties which make them eminently suitable for membrane separation processes.

DESCRIPTION OF THE INVENTION

The composition used in the separation process is a block copolymer of a specified polyamide and a specified poly (dioxa-amide). The polyamide portion of the molecule is a bivalent radical of a nylon which is the generic description of condensation polymers of a diamine and a dibasic acid. Preferably it is melt spinnable and has no ether linkages. Examples of melt spinnable polyamides having no ether linkages are as follows: nylon-6, 10 [poly(hexamethylene sebacamide)]; nylon-6 [poly-(pentamethylene carbonamide)]; nylon-6,6 (hexamethylene adipamide); nylon-11 [poly(decamethylene carbonamide)]; MXD-6 [poly(meta-xylene adipamide)]; PACM-9 [bis(para-aminocyclohexyl)-methane azelamide]; PACM-10 [bis-(para-aminocyclohexyl)-methane sebacamide]; and PACM-12 [bis(para-aminocyclohexyl)methane dodecanoamide]. Others are listed in ENCYCLOPEDIA OF POLYMER SCIENCE AND TECHNOLOGY, Vol. 10, Section Polyamide Fibers, Table 12. Methods for preparing these polyamides are well known and described in numerous patents and trade journals.

The poly(dioxa-amide) portion of the molecule contains both a double oxygen linkage, i.e., -R-O-R-O-R- and amide linkage, i.e., -N-C. The following repeating structural formula depicts the composition used in this invention wherein the "y" radical is the poly(dioxa-amide) portion:

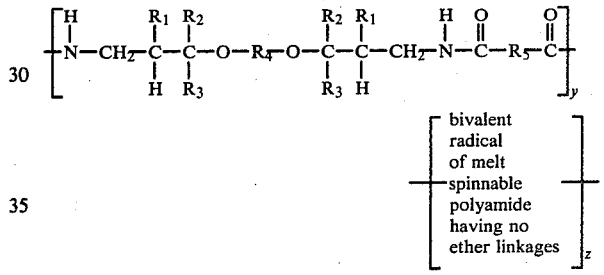

wherein $R_1$, $R_2$ and $R_3$ are selected from the group consisting of H, $C_1$-$C_{10}$ alkyls and $C_3$-$C_{10}$ isoalkyls; $R_4$ is selected from the group consisting of $C_6$-$C_{12}$ aryls, $C_1$-$C_{10}$ alkylenes and $C_3$-$C_{10}$ isoalkylenes; $R_5$ is selected from the group consisting of $C_0$-$C_{10}$ alkylenes and $C_3$-$C_{10}$ isoalkylenes; and $y=4$–$200$ and $z=4$–$300$. Examples of $C_1$-$C_{10}$ alkyls are methyl, propyl, butyl, pentyl, etc.; examples of the $C_3$-$C_{10}$ isoalkyls are isopropyl, isobutyl, isopentyl and the like. Examples of $C_1$-$C_{10}$ alkylenes are as follows: methylene, dimethylene, trimethylene and the like; examples of $C_3$-$C_{10}$ isoalkylenes are as follows: methyltrimethylene, 2-methyltetramethylene and the like. The molecular weight of the copolymer is about 5000–100,000, preferably 10,000–50,000.

The poly(dioxa-amide) portion of the composition can be prepared by the following generalized scheme:

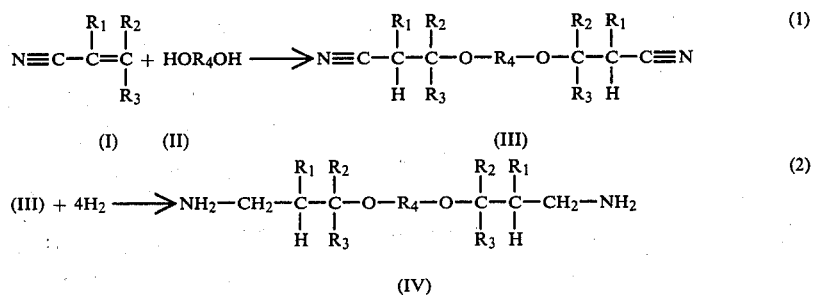

 (3)

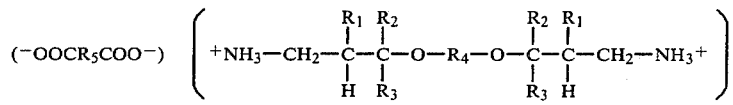

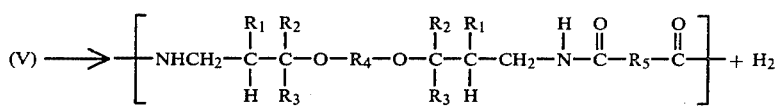 (4)

Examples of HOR$_4$OH of reaction (1) are as follows: ethylene glycol, propylene glycol and trimethylene glycol. Examples of HOOCR$_5$COOH of reaction (3) are as follows: malonic, succinic, glutaric, adipic, pimelic, suberic, azelaic sebacic, undecanedioic α,α-diethylsuccinic and α-methyl-α-ethyl suberic.

Reaction (1) is often referred to as cyanoethylation, reaction (2) is a hydrogenation, reaction (3) is the reaction between a diacid and diamine resulting in a salt and reaction (4) is often referred to as a condensation polymerization, in which case the repeating unit contains fewer atoms than the monomer, and necessarily, the molecular weight of the polymer as formed is less than the sum of the molecular weights of all the original monomer units which were combined in the reaction to form the polymer chain.

A variation of preparation reactions (1) and (2) is also disclosed in CHEMICAL ABSTRACT 3935K, Vol. 71 (1969) S. African Patent No. 6,704,646.

Examples of poly(dioxa-amide) polymer that can be prepared in the aforementioned generalized scheme are the following:

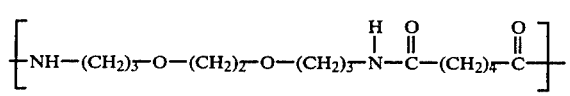

poly(4,7-dioxadecamethylene adipamide), also N-30203-6

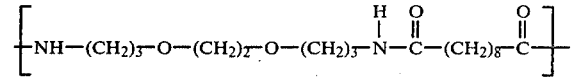

poly(4,7-dioxadecamethylene sebacamide), also N-30203-10

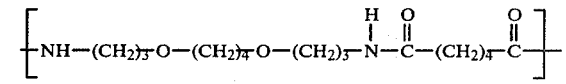

poly(4,9-dioxadodecamethylene adipamide), also N-30403-6

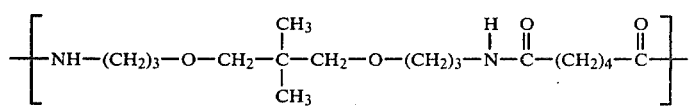

poly(4,8-dioxa-6,6-dimethylundecamethylene adipamide)

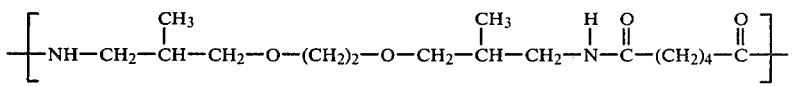

poly(4,7-dioxa-2,9-dimethyldodecamethylene adipamide)

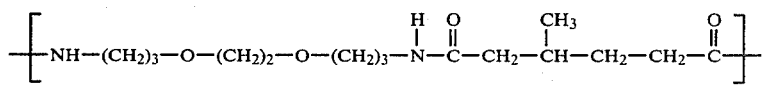

poly(4,7-dioxadecamethylene-2-methyladipamide)

The aforementioned y and z both can equal 4 and are preferably at least 15. Increasing the value of y tends to increase the permeability of films made therefrom. Preferred maximum values of y and z are about 175 and 185, respectively, more preferred values are about 100 and 130 but values of 200 and 300 are operative. Values of y and z are median values.

Films can be made from the copolymer by conventional techniques such as solvent casting with aqueous formic acid or tetrafluoroethanol. Alternatively, melt, i.e., extrusion techniques can be employed.

The polymers of present invention can also contain an antioxidant such as 1,3,5-trimethyl-2,4,6-tris(3,5-ditertiarybutyl-4-hydroxybenzyl)benzene. Small amounts of antioxidant, e.g., 0.5 weight percent, are satisfactory, however, as little as 0.01 weight percent can be used or as much as 2.0 weight percent also can be satisfactory. Antioxidants other than the aforementioned one can be used. The antioxidant generally would be mixed in combination with the two polymers prior to melt blending. Other usual additives for polyamides such as delusterants and/or light stabilizers can also be incorporated.

EXAMPLE 1

A copolymer is prepared according to the procedure of Run 11, U.S. Pat. No. 4,130,602, except that 275° C. and 45 minutes is used instead of 295° C. and 30 minutes. The copolymer has a molecular weight of about 30,000 and y and z values of 111 and 167 respectively.

EXAMPLE 2

The polymer prepared in Example 1 is formed into a film about 2 mils thick using a drum two inches in diameter and spinning at about 1725 RPM by virtue of a shaft on the drum attached to an ordinary motor. The polymer is dissolved in a solvent of 80% formic acid-20% water and is added to the spinning drum in a hood at 40° C. As spinning progresses the film deposits on the inside of the drum and solvent evaporates out the open end thereof. After several minutes the film is removed from the inner surface of the drum.

A membrane separator consists of a closed Parr reactor. Inside the reactor a porous steel plate 1½ inches in diameter has a hole in the center connected to the atmosphere by tubing through a hole in the top of the reactor. The copolymer film is attached to the underside of the plate. Means are provided to supply air pressure to the reactor.

The reactor is charged with a 3½% NaCl solution to about fill the reactor. Air pressure in the reactor is increased to and maintained at 500–800 psi. The salt solution passes through the membrane and is collected outside the reactor. The effluent shows an NaCl rejection of 99% at a flow rate of 20 gal/Ft²/day.

We claim:

1. In a separation process in which a liquid containing a material desired to be removed is caused to diffuse through a semipermeable membrane effective to diffuse the liquid component and said material at different rates, thereby forming a liquid having a reduced amount of said material, the improvement which comprises using as said membrane a block copolymer of a nylon and a poly(dioxa-amide) having a molecular weight of about 5000–100,000 and the following repeating structural formula:

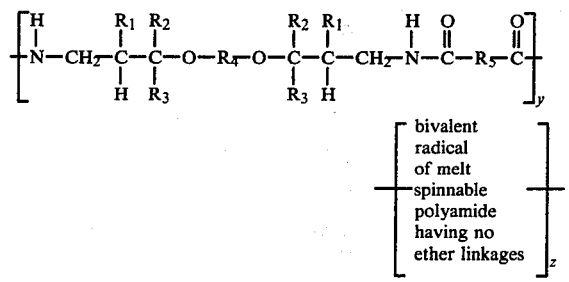

wherein
$R_1$, $R_2$ and $R_3$ are selected from the group consisting of H, $C_1$-$C_{10}$ alkyls and $C_3$-$C_{10}$ isoalkyls;
$R_4$ is selected from the group consisting of $C_1$-$C_{10}$ alkylenes and $C_3$-$C_{10}$ isoalkylenes;
$R_5$ is selected from the group consisting of $C_0$-$C_{10}$ alkylenes and $C_3$-$C_{10}$ isoalkylenes; and y=4–200, z=4–200.

2. Process according to claim 1 wherein said liquid is aqueous.

3. Process according to claims 1 or 3 wherein the nylon is selected from the group consisting of nylon-6 and PACM-12.

4. Process according to claims 1 or 3 wherein the copolymer is hydrophilic.

5. Process according to claim 1 wherein the nylon is selected from the group consisting of nylon-6,10; nylon-6; nylon-6,6; nylon-11, MXD-6; PACM-10 and PACM-12.

* * * * *